(12) United States Patent
Hwang et al.

(10) Patent No.: US 8,332,685 B2
(45) Date of Patent: Dec. 11, 2012

(54) METHOD OF DETERMINING DEFECTS IN INFORMATION STORAGE MEDIUM, RECORDING/REPRODUCING APPARATUS USING THE SAME, AND INFORMATION STORAGE MEDIUM

(75) Inventors: Sung-hee Hwang, Suwon-si (KR); Jung-wan Ko, Suwon-si (KR); Hyo-lin Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/368,524

(22) Filed: Feb. 8, 2012

(65) Prior Publication Data

US 2012/0137169 A1    May 31, 2012

Related U.S. Application Data

(63) Continuation of application No. 12/344,628, filed on Dec. 29, 2008, now Pat. No. 8,140,891, which is a continuation of application No. 11/274,291, filed on Nov. 16, 2005, now Pat. No. 7,490,262.

(30) Foreign Application Priority Data

Nov. 22, 2004   (KR) ................................. 2004-95909

(51) Int. Cl.
   *G06F 11/00*   (2006.01)
(52) U.S. Cl. .......................................... 714/6.1; 714/5.1
(58) Field of Classification Search .................... 714/6.1, 714/5.1, 5.11, 6.11, 6.32; 369/47.14, 53.15, 369/53.17, 275.5
   See application file for complete search history.

(56) References Cited

U.S. PATENT DOCUMENTS

| | | | |
|---|---|---|---|
| 6,160,778 A | 12/2000 | Ito et al. |
| 6,189,113 B1 | 2/2001 | Rabb et al. |
| 6,233,699 B1 | 5/2001 | Sasaki et al. |
| 6,418,100 B1 | 7/2002 | Park et al. |
| 6,526,522 B1 | 2/2003 | Park et al. |

(Continued)

FOREIGN PATENT DOCUMENTS

EP    1 600 969    11/2005

(Continued)

OTHER PUBLICATIONS

Japanese Office Action issued on Feb. 15, 2011, in corresponding Japanese Patent Application No. 2007-542900 (3 pages).

(Continued)

*Primary Examiner* — Dieu-Minh Le
(74) *Attorney, Agent, or Firm* — NSIP Law

(57) ABSTRACT

A method of determining whether a defect exists on an information storage medium is provided along with a recording/reproducing apparatus using the same. Such a method comprises: seeking a defect entry whose state information indicates that a defect block or a replacement block has been re-initialized without certification from a defect list for managing an information storage medium and including state information of the defect block and state information of the replacement block, wherein the medium includes a spare area for recording the replacement block to replace the defect block occurring in a user data area on the medium; and certifying the defect block or the replacement block registered in the sought defect entry. As a result, defect information can be effectively rearranged for quick re-initialization without certification in order to improve the performance of a drive system.

2 Claims, 14 Drawing Sheets

U.S. PATENT DOCUMENTS

| | | | |
|---|---|---|---|
| 6,785,839 | B2 | 8/2004 | Ko et al. |
| 6,963,523 | B1 | 11/2005 | Park |
| 6,978,404 | B2 | 12/2005 | Ueda et al. |
| 7,490,262 | B2 * | 2/2009 | Hwang et al. ............ 714/6.13 |
| 8,140,891 | B2 * | 3/2012 | Hwang et al. ............ 714/6.1 |
| 2002/0145966 | A1 | 10/2002 | Hirotsune et al. |
| 2004/0156281 | A1 | 8/2004 | Park et al. |
| 2004/0160868 | A1 | 8/2004 | Sasaki et al. |
| 2005/0265191 | A1 | 12/2005 | Hwang et al. |
| 2007/0094550 | A1 | 4/2007 | Ai |
| 2010/0046336 | A1 | 2/2010 | Takahashi et al. |

FOREIGN PATENT DOCUMENTS

| | | |
|---|---|---|
| EP | 1 650 761 | 4/2006 |
| JP | 02-023417 A | 1/1990 |
| JP | 04-103082 A | 4/1992 |
| JP | 08-227557 A | 9/1996 |
| JP | 2000-021092 A | 1/2000 |
| JP | 2000-195178 | 7/2000 |
| JP | 2000-322836 | 8/2000 |
| JP | 2000-293959 A | 10/2000 |
| JP | 2002-163864 | 6/2002 |
| JP | 2003-006876 | 1/2003 |
| JP | 2003-346429 A | 12/2003 |
| KR | 10-2005-0112530 A | 12/2005 |
| TW | 200415620 | 8/2004 |
| TW | 200423098 | 11/2004 |
| TW | 200425116 | 11/2004 |
| WO | WO 01/75879 A1 | 10/2001 |
| WO | WO 2004/059648 | 7/2004 |
| WO | WO 2005/109432 | 11/2005 |

OTHER PUBLICATIONS

Japanese Office Action issued Jan. 4, 2011, in counterpart Japanese Application No. 2007-542900 (7pp, including English translation).

International Search Report issued in International Application No. PCT/KR 2005/3890 on Feb. 14, 2006.

"120 mm DVD Rewritable Disk." *Standard ECMA-272. 2$^{nd}$ Edition*. Jun. 1999.

"120 mm (4,7 Gbytes per side) and 80 mm (1,46 Gbytes per side) DVD Rewritable Disk (DVD-RAM)." *Standard ECMA-300, 3$^{rd}$ Edition*. Jun. 2005.

Communication issued by the European Patent Office on Apr. 7, 1999.

Notice of Allowance date Aug. 21, 2009 issued in corresponding Malaysian Patent Application No. PI20055432.

U.S. Appl. No. 12/344,628, filed Dec. 29, 2008, Sung-hee Hwang et al., Samsung Electronics Co., Ltd.

U.S. Appl. No. 11/274,291, filed Nov. 16, 2005, Sung-hee Hwang et al., Samsung Electronics Co., Ltd.

Taiwanese Notice of Allowance issued Feb. 27, 2009, in Taiwanese Patent Application No. 94140763.

Japanese Trial Decision mailed Jun. 19, 2012, issued in counterpart Japanese Patent Application No. 2007-542900; 22 pages including English Translation.

* cited by examiner

FIG. 8A

DFL ENTRIES RIGHT BEFORE RE-INITIALIZATION  420

| FIRST STATE INFORMATION | PHYSICAL ADDRESS OF DEFECT BLOCK | SECOND STATE INFORMATION | PHYSICAL ADDRESS OF REPLACEMENT BLOCK |
|---|---|---|---|
| 1 | 0010000h | 0 | ... |
| 2 | 0010100h | 0 | ... |
| 3 | 0010110h | 0 | ... |
| ... | ... | ... | ... |

FIG. 8B

DFL ENTRIES AFTER RE-INITIALIZATION  420

| FIRST STATE INFORMATION | PHYSICAL ADDRESS OF DEFECT BLOCK | SECOND STATE INFORMATION | PHYSICAL ADDRESS OF REPLACEMENT BLOCK |
|---|---|---|---|
| 3 | 0010000h | 1 | ... |
| 3 | 0010100h | 1 | ... |
| 3 | 0010110h | 1 | ... |
| ... | ... | ... | ... |

FIG. 10A

DFL ENTRIES RIGHT BEFORE RE-INITIALIZATION

420

| FIRST STATE INFORMATION | PHYSICAL ADDRESS OF DEFECT BLOCK | SECOND STATE INFORMATION | PHYSICAL ADDRESS OF REPLACEMENT BLOCK |
|---|---|---|---|
| 1 | 0010000h | 0 | ... |
| 2 | 0010100h | 0 | ... |
| 3 | 0010110h | 0 | ... |
| 5 | ... | 0 | 0100000h |
| ... | ... | ... | ... |

FIG. 10B

DFL ENTRIES AFTER RE-INITIALIZATION

420

| FIRST STATE INFORMATION | PHYSICAL ADDRESS OF DEFECT BLOCK | SECOND STATE INFORMATION | PHYSICAL ADDRESS OF REPLACEMENT BLOCK |
|---|---|---|---|
| 3 | 0100000h | 1 | ... |
| 5 | ... | 1 | 0010000h |
| 5 | ... | 1 | 0010100h |
| 5 | ... | 1 | 0010110h |
| ... | ... | ... | ... |

FIG. 12A

| FIRST STATE INFORMATION | PHYSICAL ADDRESS OF DEFECT BLOCK | SECOND STATE INFORMATION | PHYSICAL ADDRESS OF REPLACEMENT BLOCK |
|---|---|---|---|
| 2 | ⓐ | 1 | . |
| 3 | ⓑ | 1 | . |
| 4 | . | 1 | ⓒ |
| 5 | . | 1 | ⓓ |
| 1 | ⓔ | 0 | ⓔ |
| 2 | ⓕ | 0 | . |
| ... | ... | ... | ... |

510 — FIRST STATE INFORMATION
520 — PHYSICAL ADDRESS OF DEFECT BLOCK
530 — SECOND STATE INFORMATION
540 — PHYSICAL ADDRESS OF REPLACEMENT BLOCK
420

OBJECTS OF CERTIFICATION

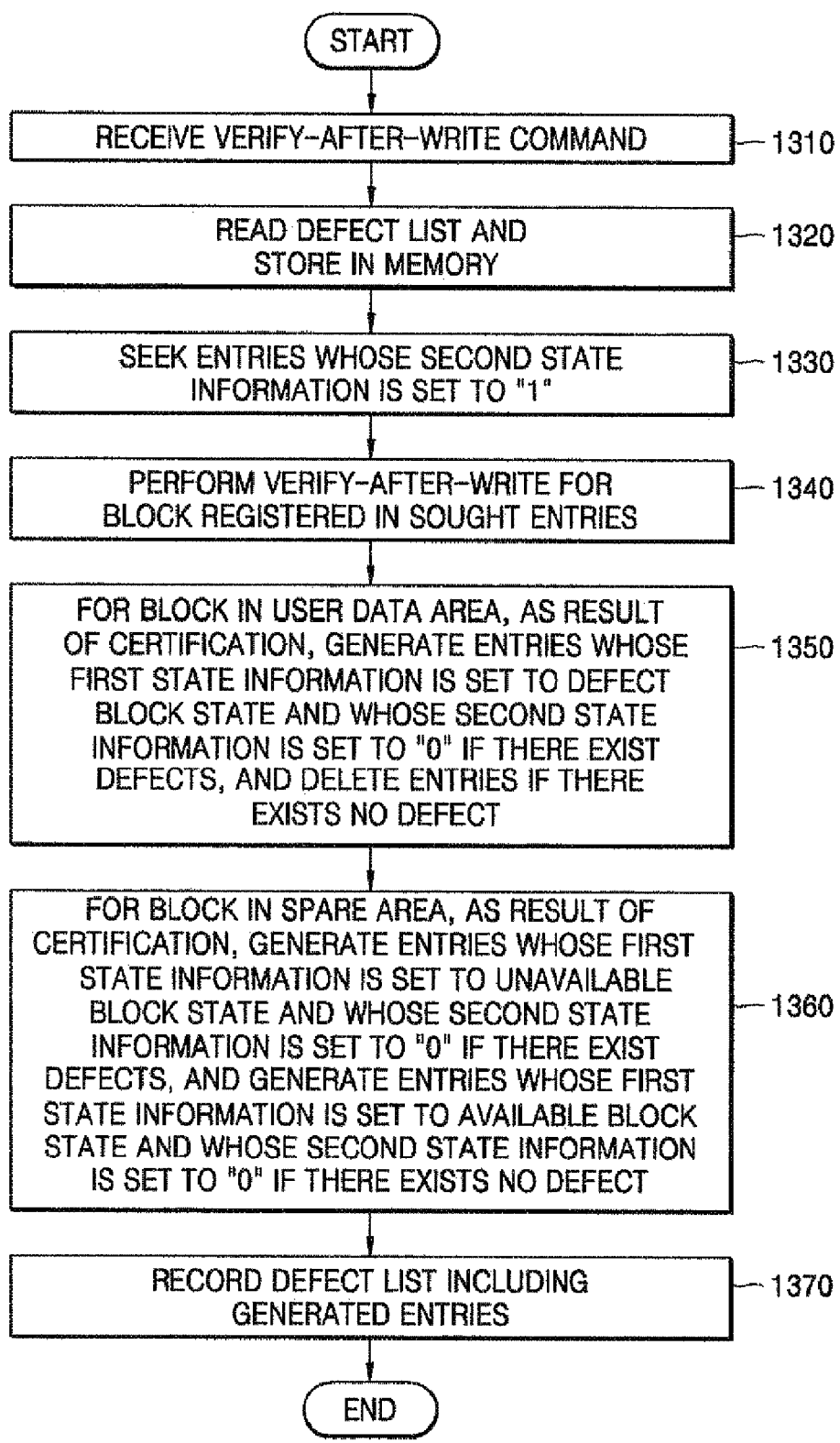

METHOD OF DETERMINING DEFECTS IN INFORMATION STORAGE MEDIUM, RECORDING/REPRODUCING APPARATUS USING THE SAME, AND INFORMATION STORAGE MEDIUM

CROSS-REFERENCE TO RELATED APPLICATION

This application is continuation of U.S. patent application Ser. No. 12/344,628, filed on Dec. 29, 2008 now U.S. Pat. No. 8,140,891, which is a continuation of U.S. patent application Ser. No. 11/274,291, filed on Nov. 16, 2005 now U.S. Pat. No 7,490,262, now allowed, which claims all benefits accruing under 35 U.S.C. §119 from Korean Patent Application No. 2004-95909, filed on Nov. 22, 2004, in the Korean Intellectual Property Office, the disclosures of which are incorporated herein by reference.

BACKGROUND OF THE INVENTION

1. Field of the Invention

The present invention relates to an information storage medium, and more particularly, to a method of determining whether a defect exists on an information storage medium, a recording/reproducing apparatus using the same, and an information storage medium.

2. Related Art

The number of defects on a rewritable information storage medium increases due to fingerprints and dust according to use of the medium. Defect blocks occurring during the use of the medium are managed and registered in a defect information area, and a host or a drive system is informed of the defect blocks. As a result, a host or a drive system does not allocate data to these defect blocks, and records data only in non-defect blocks. However, when the number of defect blocks increases, a user typically re-initializes the medium.

In specific situations, when the user removes the fingerprints or dust from the surface of the medium, the defect blocks registered in the defect information area may be determined as non-defect blocks through a verify-after-write process. If the re-initialization of the rewritable information storage medium is necessary, the drive system determines whether entire blocks in recordable areas on the medium or the defect blocks registered in the defect information area are defect blocks through the verify-after-write process.

However, if all the blocks on the medium or the defect blocks registered in the defect information area are defect blocks through the verify-after-write process, the re-initialization can be very time intensive, which can inconvenient the user.

Accordingly, there is a need to provide techniques in which defects and potential defects occurring on an information storage medium can be effectively managed and re-initialization can be quickly executed without a verify-after-write process.

SUMMARY OF THE INVENTION

Various aspects and example embodiments of the present invention advantageously provide an information storage medium and a recording/reproducing apparatus equipped with a quick re-initialization of the information storage medium, and a recording/reproducing method using the same.

The present invention also provides a method of effectively managing information on potential defects in an information storage medium occurring due to a quick re-initialization operation without a verify-after-write process, and a recording/reproducing apparatus using the same.

According to an aspect of the present invention, there is provided a method of determining whether defects exist in an information storage medium having a data area including a user data area for recording data and a spare area for recording a replacement block to replace a defect block occurring in the user data area. Such a method comprises: seeking a defect entry whose state information indicates that a defect block or a replacement block has been re-initialized without certification, from a defect list for managing the medium and including state information of the defect block and state information of the replacement block; and certifying the defect block or the replacement block registered in the sought defect entry.

The method may further comprise: deleting the defect entry whose state information indicates that the defect block or the replacement block has been re-initialized without certification from the defect list as a result of the certification.

State information indicating that a corresponding block is a defectable block may be further included in the defect entry whose state information indicates that the defect block or the replacement block has been re-initialized without certification. The certifying may comprise: deleting the defect entry from the defect list, if no defect exists in the defectable block as a result of the certification of the defectable block; and generating a defect entry whose state information indicates that the corresponding block is a defect block, if a defect exists in the defectable block as the result of the certification of the defectable block, wherein state information indicating that the defect block or the replacement block has been re-initialized without certification is not set in the defect entry.

State information indicating that a corresponding replacement block is an available replacement block or state information indicating that the corresponding replacement block is an unavailable replacement block may be further included in the defect entry whose state information indicates that the defect block or the replacement block has been re-initialized without certification. The certifying may comprise: generating a defect entry whose state information indicates that the corresponding replacement block is an available replacement block, if no defect exists in the corresponding replacement block as a result of the certification of the corresponding replacement block, wherein state information indicating that the defect block or the replacement block has been re-initialized without certification is not set in the defect entry; and generating a defect entry whose state information indicates that the corresponding replacement block is an unavailable replacement block, if a defect exists in the corresponding replacement block as the result of the certification of the corresponding replacement block, wherein state information indicating that the defect block or the replacement block has been re-initialized without certification is not set in the defect entry.

According to another aspect of the present invention, there is provided a recording/reproducing apparatus comprising: a write/read unit to record data on an information storage medium and reading data from the medium; and a control unit arranged to control the write/read unit to read a defect list including state information of a defect block and state information of a replacement block in order to manage the medium including a spare area for recording the replacement block to replace the defect block occurring in a user data area on the medium, to seek a defect entry whose state information indicates that the defect block or the replacement block has been re-initialized without certification, and to certify the defect block or the replacement block registered in the defect entry.

The control unit may delete the defect entry whose state information indicates that the defect block or the replacement block has been re-initialized without certification from the defect list as a result of the certification.

According to another aspect of the present invention, there is provided an information storage medium having recorded thereon a defect list including state information of a defect block and state information of a replacement block in order to manage the medium including a spare area recording for the replacement block to replace the defect block occurring in a user data area on the medium, and in which the defect block or the replacement block registered in a defect entry whose state information indicates that the defect block or the replacement block has been re-initialized without certification is certified in a certification operation of the medium.

The defect entry whose state information indicates that the defect block or the replacement block has been re-initialized without certification may be deleted from the defect list as a result of the certification.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 8A is a diagram of state information of a defect list just before a new spare area is allocated according to an embodiment of the present invention in a state illustrated in FIG. 7A, and FIG. 8B is a diagram of state information of the defect list just after the new spare area is allocated in a state illustrated in FIG. 7B;

FIG. 10A is a diagram of state information of a defect list just before new spare areas are allocated according to an embodiment of the present invention in a state illustrated in FIG. 9A, and FIG. 10B is a diagram of state information of the defect list just after the new spare areas are allocated in a state illustrated in FIG. 9B;

FIG. 12A is an example of entries indicating state information of the blocks in the state illustrated in FIG. 11B;

FIG. 13 is a flowchart illustrating procedures of a verify-after-write operation according to an embodiment of the present invention.

DETAILED DESCRIPTION OF THE INVENTION

Embodiments of the present invention will now be described in detail with reference to the accompanying drawings.

Figure 1:
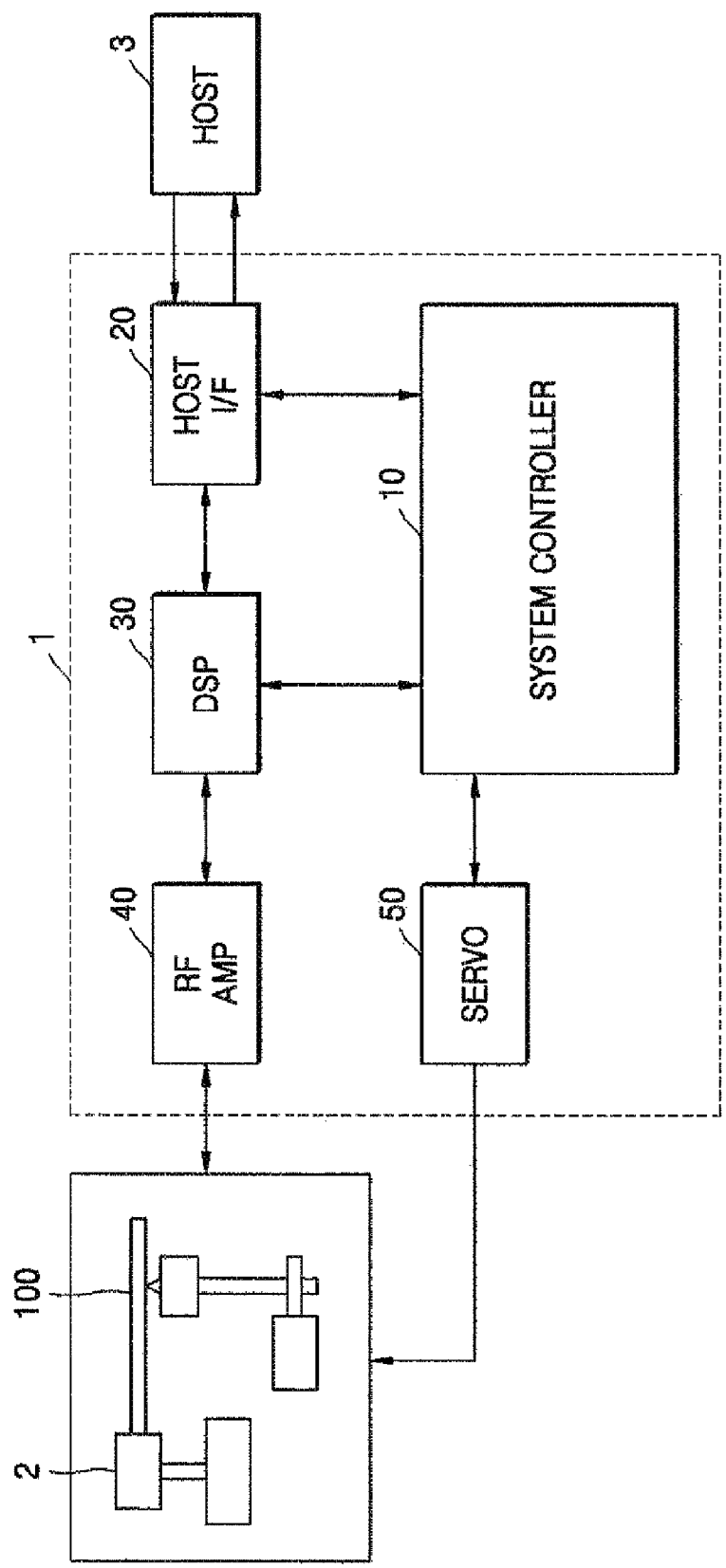
FIG. 1 is a schematic block diagram of an example recording/reproducing apparatus according to an embodiment of the present invention.

Turning now to FIG. 1, a schematic block diagram of an example recording/reproducing apparatus according to an embodiment of the present invention is illustrated. Referring to FIG. 1, the recording/reproducing apparatus includes a write/read unit 2 and a control unit 1. For purposes of brevity, the recording/reproducing apparatus, albeit in whole or in part, can also be referred to as a drive system which can be internal (housed within a host 3) or external (housed in a separate box that connects to a host 3, as shown in FIG. 1). An information storage medium can be any rewritable optical disc, such as DVD-RW, DVD+RW, CD-RW and other high density disc, such as blue-ray disc (BD) and advanced optical disc (AOD). However, other storage media can also be utilized, including DVD, DVD-R, DVD-RAM, DVD-ROM, CD, CD-R, and CD-ROM. In addition, such a recording/reproducing apparatus may be a single apparatus, or may be separated into a recording apparatus (i.e., digital video disc recorder "DVDR") and a reading apparatus (i.e., compact disc player "CDP" or digital video disc player "DVDP").

The write/read unit 2 records data on a disk 100, which is an information storage medium according to the present embodiment, and reads the recorded data by using an optical pickup (not shown).

The controller 1 controls the write/read unit 2 to record data on the disk 100 and read data from the disk 100 according to a predetermined file system. In particular, according to embodiments of the present invention, the control unit 1 allocates a new spare area for disk re-initialization and manages state information of defect blocks in a user data area and state information of replacement blocks in the new spare area.

The control unit 1 includes a system controller 10, a host interface (I/F) 20, a digital signal processor (DSP) 30, a radio frequency amplifier (RF AMP) 40, and a servo 50.

In a recording operation, the host I/F 20 receives a predetermined write command from a host 3 and transmits the write command to the system controller 10. The system controller 10 controls the DSP 30 and the servo 50 in order to perform the write command received from the host I/F 20. The DSP 30 adds additional data, such as, parity bits for error correction to data to be recorded which is received from the host I/F 20, generates an error correction code (ECC) block, which is an error correction block, by performing ECC encoding on the data, and modulates the generated ECC block in a predetermined manner. The RF AMP 40 converts the data output from the DSP 30 to an RF signal. The write/read unit 2 including an optical pickup (not shown) records the RF signal output from the RF AMP 40 on the disk 100. The servo 50 receives a command required for a servo control from the system controller 10 and servo-controls the optical pickup included in the write/read unit 2.

In particular, according to the embodiments of the present invention, the system controller 10 manages defect states of blocks when a new spare area is allocated on the disk 100 for disk re-initialization.

If the system controller 10 determines that a physical address of a defect block in a user data area on the disk 100 before the disk re-initialization is still included in the user data area after allocation of a new spare area on the disk 100, the system controller 10 controls the write/read unit 2 to record a defect list (DFL) entry having state information indicating that the defect block is re-initialized and is a defectable block instead of a DFL entry for the defect block.

If the system controller 10 determines that a physical address of the defect block in a user data area on the disk 100 before the disk re-initialization is included in a physical address of a replacement block in a new spare area after allocation of the new spare area on the disk 100, the system controller 10 controls the write/read unit 2 to record a DFL entry having state information indicating that the replacement block is re-initialized and is an unavailable replacement block (i.e., a replacement block that cannot be used for replacement) instead of a DFL entry for the replacement block.

If the system controller 10 determines that a physical address of an unavailable replacement block in the spare area on the disk 100 before the disk re-initialization is included in a physical address of a user data area after allocation of a new spare area on the disk 100, the system controller 10 controls the write/read unit 2 to record a DFL entry having state information indicating that the defect block is re-initialized and is a defectable block instead of a DFL entry for the defect block. Since the replacement block is in the spare area before the disk re-initialization, and after the disk re-initialization, the replacement block belongs to the user data area, the replacement block is referred to "defect block." The DFL entry and state information will be described in detail later.

When a certification is partially or fully performed for the disk 4, the system controller 10 certifies blocks registered in DFL entries having defect information generated in response to a quick re-initialization performed without certification, i.e., state information indicating that re-initialization without certification has been performed, and deletes the DFL entries whose state information indicates that re-initialization without certification has been performed.

In detail, when state information indicating that a corresponding block is a defectable block is further included in the state information indicating that re-initialization without certification has been performed, if no defect exists in the defectable block as a result of the certification of the defectable block, the system controller 10 deletes a corresponding DFL entry from a defect list. However, if a defect exists in the defectable block as a result of the certification of the defectable block, the system controller 10 generates a DFL entry whose the state information indicates that the corresponding block is a defect block, wherein the state information indicating that re-initialization without certification has been performed is not set in the DFL entry.

When state information indicating that a corresponding replacement block is an available replacement block (i.e., a block that can be used for replacement) or state information indicating that the corresponding replacement block is an unavailable replacement block is further included in the state information indicating that re-initialization without certification has been performed, if no defect exists in the corresponding replacement block as a result of the certification of the corresponding replacement block, the system controller 10 generates a DFL entry whose state information indicates that the corresponding replacement block is an unavailable replacement block, wherein the state information indicating that re-initialization without certification has been performed is not set in the DFL entry. However, if a defect exists in the corresponding replacement block as a result of the certification of the corresponding replacement block, the system controller 10 generates a DFL entry whose state information indicates that the corresponding replacement block is an available replacement block, wherein the state information indicating that re-initialization without certification has been performed is not set in the DFL entry.

In a reproduction operation, after the host I/F 20 receives a reproduction command from the host 3, the system controller 10 performs initialization for data reproduction. The write/read unit 2 radiates a laser beam, via the optical pickup, on the disk 100 and outputs an optical signal obtained by receiving the laser beam reflected from the disk 100. The RF AMP 40 converts the optical signal output from the write/read unit 2 to an RF signal, provides modulated data obtained from the RF signal to the DSP 30, and provides a servo control signal obtained from the RF signal to the servo 50. The DSP 30 demodulates the modulated data and outputs data obtained through ECC error correction. The servo 50 servo controls the optical pickup based on the servo control signal received from the RF AMP 40 and the command required for the servo control received from the system controller 10. Then, the host I/F 20 transmits data received from the DSP 30 to the host 3.

A structure of an example information storage medium according to embodiments of the present invention will now be described with reference to FIG. 2 and FIG. 3 herein below.

Figure 2:
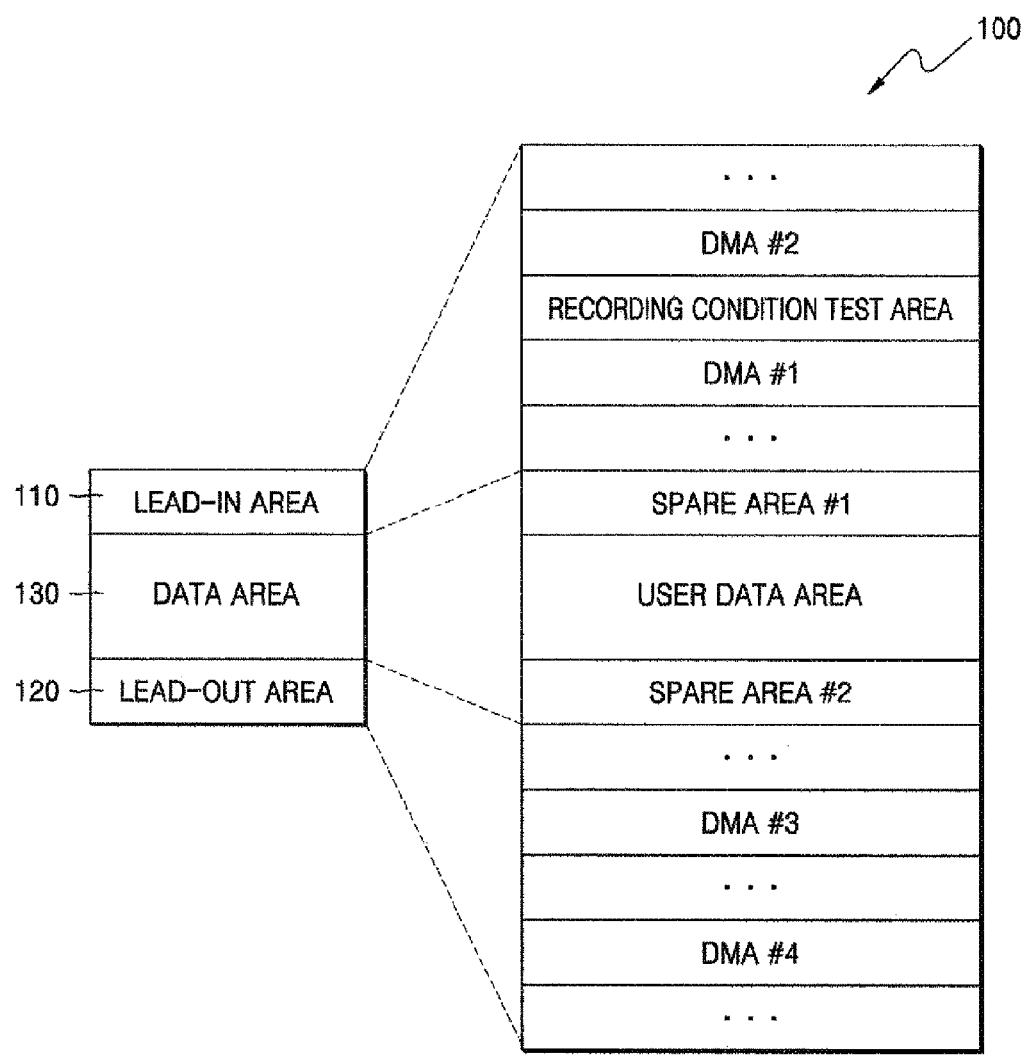
FIG. 2 is a structural diagram of an example information storage medium that is a single layer disk according to an embodiment of the present invention.

FIG. 2 is a structural diagram of an example information storage medium that is a single layer disk according to an embodiment of the present invention. Referring to FIG. 2, the disk 100 includes a lead-in area 110 located in an inner circumference of the disk 100, a lead-out area 120 located in an outer circumference of the disk 100, and a data area 130 located in an intermediate portion between the lead-in area 110 and the lead-out area 120 in a disk radius direction where user data is recorded.

The lead-in area 110 includes a defect management area (DMA) #2, a recording condition test area, and a DMA #1. The data area 130 includes a spare area #1, a user data area, and a spare area #2. The lead-out area 120 includes a DMA #3 and a DMA #4.

Each DMA is used to store defect management information for rewritable information storage media, and is typically located in either the lead-in area 110 or the lead-out area 130 of the disk 100.

When the disk 100 is initialized, a drive manufacturer or a user can set the sizes of spare areas in the data area 130 wherein replacement blocks for replacing defect blocks due to defects generated in predetermined portions of the user data area are to be recorded. The drive manufacturer or user can also decide whether to allocate the spare areas in the data area 130 or other areas on the disk 100. If it is necessary to reinitialize the disk, spare areas can be newly allocated on the disk 100.

Defect management information recorded in the DMAs may include a defect list (DFL) for defect information and a disk definition structure (DDS) including information on a structure of the data area 130 on the disk 100.

The defect list (DFL) is typically comprised of a DFL header and DFL entries. A structure of an example defect list (DFL) will be described in detail with reference to FIG. 4.

The recording condition test area is an area provided for performing optimum power control (OPC) procedure, that is, a test with various write powers based on write strategies to determine an optimal write power and write variables for the disk 100 and the recording/reproducing apparatus in combination.

Figure 3:
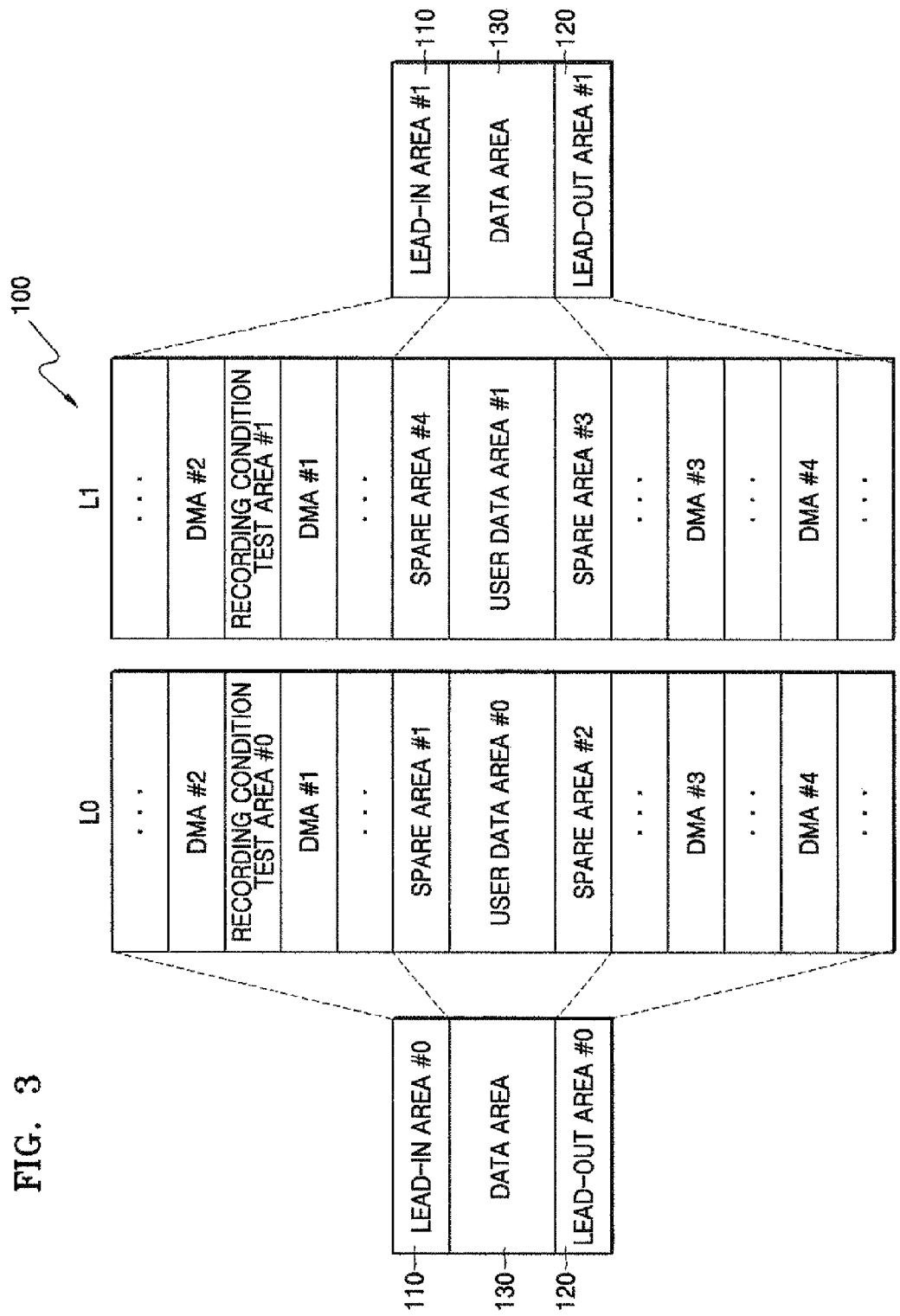
FIG. 3 is a structural diagram of an example information storage medium that is a double layer disk according to an embodiment of the present invention.

FIG. 3 is a structural diagram of an example information storage medium that is a double layer disk according to an embodiment of the present invention. However, a disk 100 having two or more recording layers can also be shown in the same manner.

Referring to FIG. 3, the disk 100 includes two recording layers L0 and L1. Specifically, a recording layer L0 includes a lead-in area #0 110, a data area #0 130, and a lead-out area #0 120. Similarly, a recording layer #1 also includes a lead-in area #1 110, a data area #1 130, and a lead-out area #1 120.

The lead-in area #0 110 of the recording layer L0 includes a DMA#1, a recording condition test area #0, and a DMA#2; the data area #0 130 of the recording layer L0 includes a spare area #1, a user data area #0, and a spare area #2; and the lead-out area #0 120 of the recording layer L0 includes a DMA #3 and a DMA #4.

Similarly, the lead-in area #1 110 of the recording layer L1 includes a DMA#1, a recording condition test area #1, and a DMA#2; the data area #1 130 of the recording layer L1 includes a spare area #3, a user data area #1, and a spare area #4; and the lead-out area #1 1208 of the recording layer L1 includes a DMA #3 and a DMA #4.

Figure 4:
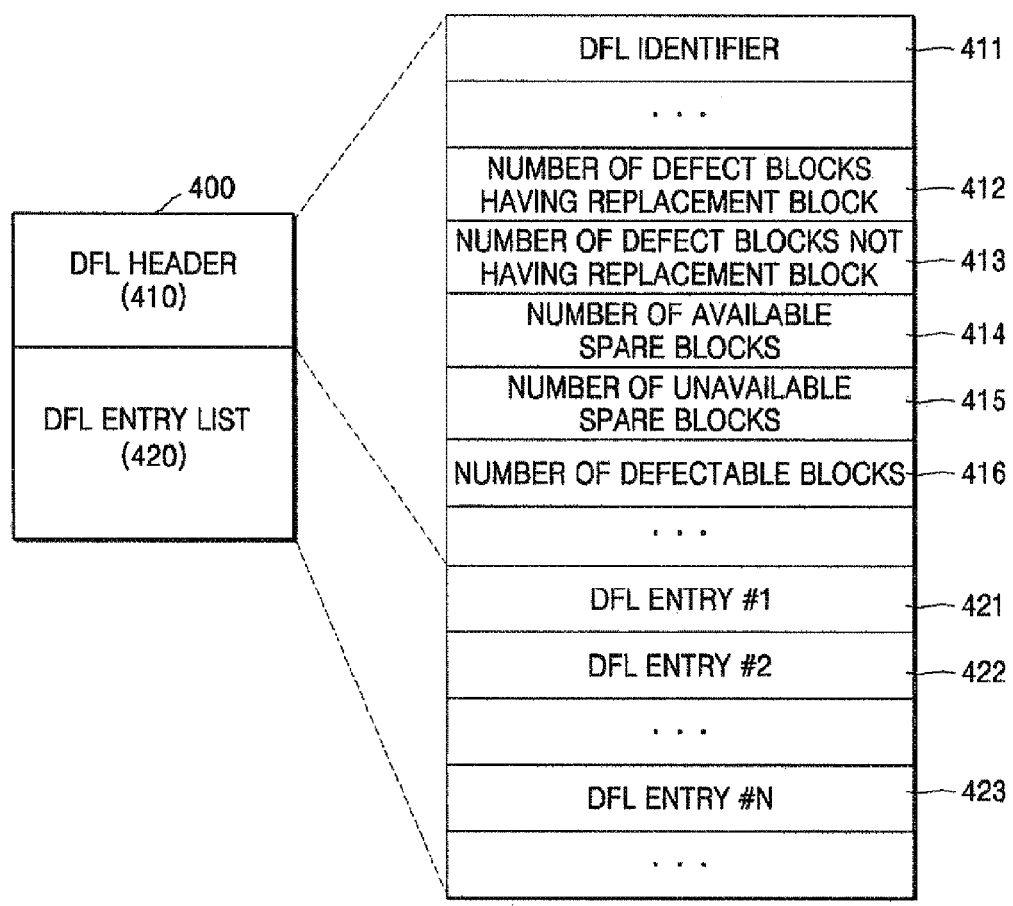
FIG. 4 is a structural diagram of a defect list according to an embodiment of the present invention.

Turning now to FIG. 4, an example data format of a defect list (DFL) 400 according to an embodiment of the present invention is illustrated. Referring to FIG. 4, the DFL 400 includes a DFL header 410, which is a part to record number information for defect management of blocks, and a DFL entry list 420, which is a list of DFL entries. For purposes of brevity, the DFL entry is referred to as a defect entry herein.

The DFL header 410 includes information on a DFL identifier 411, the number of defect blocks having a replacement block 412, the number of defect blocks not having a replacement block 413, the number of available spare blocks 414, the number of unavailable spare blocks 415, and the number of defectable blocks 416.

The number of defect blocks having a replacement block 412 represents the number of DFL entries having defect state information indicating that a defect block has been replaced with a replacement block in a spare area on the disk 100.

The number of defect blocks not having a replacement block 413 represents the number of DFL entries having defect state information indicating a defect block, which does not have a replacement block in the spare area on the disk 100.

The number of available spare blocks 414 represents the number of DFL entries having defect state information indicating a block which can be used for replacement, among unreplaced blocks in the spare area on the disk 100.

The number of unavailable spare blocks 415 represents the number of DFL entries having defect state information indicating a block which cannot be used for replacement, among the unreplaced blocks in the spare area on the disk 100.

The number of defectable blocks 416 represents the number of DFL entries having defect state information indicating a block susceptible of being a defect block but which has not been certified yet from among blocks in a user data area on the disk 100.

The DFL entry list 420, which is a set of DFL entries having defect state information on blocks, includes a DFL entry #1 421, a DFL entry #2 422 ... and a DFL entry #N 423.

Figure 5:
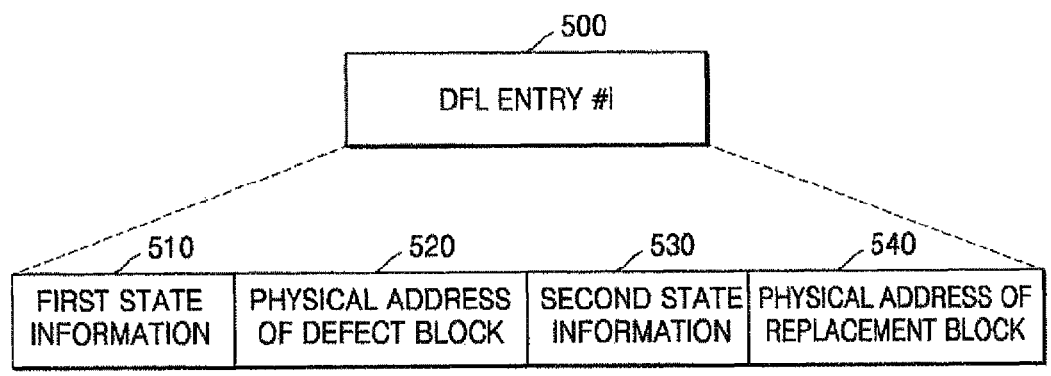
FIG. 5 is a structural diagram of a DFL entry shown in FIG. 4.

FIG. 5 illustrates an example data format of a DFL entry #i 500 illustrated in FIG. 4.

Referring to FIG. 5, the DFL entry #i 500 includes first state information 510, a physical address of a defect block 520, second state information 530, and a physical address of a replacement block 540.

The first state information 510 includes information on defect states of defect blocks in the user data area on the disk 100 and information on states indicating whether replacement blocks in the spare area are available on the disk 100. The first state information 510 will be described in detail later with reference to FIG. 6.

The second state information 530 includes information on states indicating whether blocks are re-initialized. Quick re-initialization can be achieved by indicating only information indicating that re-initialization has been performed in the second state information 530 of the DFL entry #i 500 without performing a verify-after-write process in the re-initialization. In addition, when data is recorded after the re-initialization, if second state information 530 of a DFL entry 421, 422 or 423, as shown in FIG. 4, for a block to be recorded is set to state information indicating that re-initialization has been performed, a drive system, i.e., a recording/reproducing apparatus, as shown in FIG. 1, recognizes this state; as a result, even if a host 3 commands the drive system to record data in a portion of the block, the drive system can record the data by padding predetermined data in the remaining portion of the block without an additional read-modify-write process. When a reproduction command of a block is received from the host 3, as shown in FIG. 1, if second state information 530 is set to state information indicating that re-initialization has been performed, and since the drive system recognizes that data recorded in the block is meaningless, the drive system can transmit null data or a check message to the host 3 with no delay.

The physical address of a defect block 520 is a physical address at which the defect block is located in the user data area on the disk 100, and the physical address of a replacement block 540 is a physical address at which the replacement block is located in the spare area on the disk 100.

Figure 6:
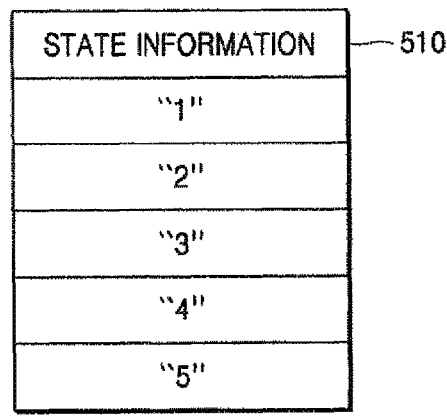
FIG. 6 is an illustrative diagram of state information of the DFL entry shown in FIG. 5.

FIG. 6 is an illustrative diagram of the first state information 510 of the DFL entry #i 500 illustrated in FIG. 5.

Referring to FIG. 6, the first state information 510 has five state information values "1," "2," "3," "4," and "5".

The state information value "1" indicates a state of a defect block having a replacement block. In this case, a physical address of the defect block exists in the user data area on the disk 100, and a physical address of the replacement block replacing the defect block exists in the spare area on the disk 100.

The state information value "2" indicates a state of a defect block not having a replacement block. In this case, a physical address of the defect block exists in the user data area on the disk 100.

The state information value "3" indicates a state of a defectable block. The defectable block indicates a block that might be a defect block which has not been certified yet through an error-correction-after-write process. Thus, the defectable block has to be certified through the error-correction-after-write process at a later time when large RF or servo signals are detected in a process of certifying or scanning a disk 100. In this case, a physical address of the defectable block indicates a physical address of a block that might be a defect block which has not been certified yet.

The state information value "4" indicates a state of a replacement block indicating an available replacement block in the spare area on the disk 100. In this case, a physical address of the replacement block indicates a physical address of an available block among unreplaced blocks in the spare area on the disk 100.

The state information value "5" indicates a state of a replacement block indicating an unavailable replacement block in the spare area on the disk 100. In this case, a physical address of the replacement block indicates a physical address of an unavailable block among the unreplaced blocks in the spare area on the disk 100.

The state information values "1," "2," and "3" indicate states of blocks in the user data area on the disk 100, and the state information values "4" and "5" indicate states of blocks in the spare area on the disk 100.

While the second state information 530 is not shown in FIG. 6, for example, if the second state information 530 is set to "1," this indicates that re-initialization of a corresponding block has been performed, and if the second state information 530 is set to "0," this indicates that this block has not been re-initialized or has been used again after re-initialization. In addition, if the second state information 530 is set to "0," this indicates that valid data is stored in the block, and if the second state information 530 is set to "1," this indicates that valid data is not stored in the block since the block has been re-initialized.

Figure 7A:
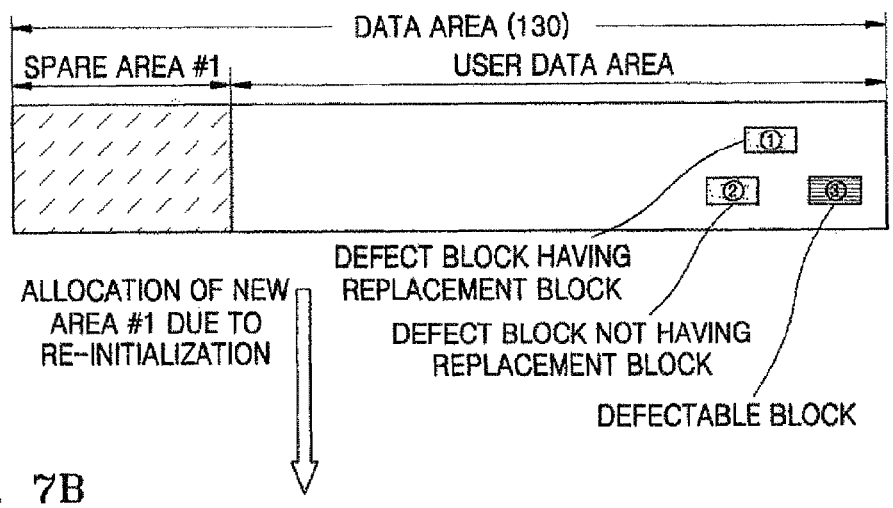
FIGS. 7A and 7B are illustrative diagrams of a method of processing DFL entries with respect to blocks in a spare area newly allocated due to disk re-initialization according to an embodiment of the present invention.
Figure 7B:
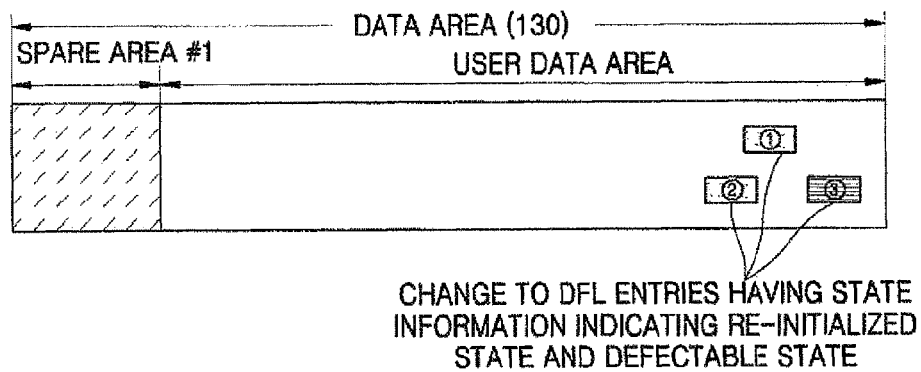

FIGS. 7A and 7B are illustrative diagrams of a method of processing DFL entries with respect to blocks in a spare area newly allocated in a data area on a disk due to disk re-initialization, according to an embodiment of the present invention.

FIG. 7A illustrates states of data blocks in an information storage medium that is a single layer disk 100, as shown in FIG. 2, in which a spare area #1 is allocated before the disk re-initialization, and FIG. 7B illustrates states of the data blocks in the disk 100 in which the spare area #1 is newly allocated on the disk 100 after the disk re-initialization.

Referring to FIG. 7A, a data area 130 includes at least a spare area #1 and a user data area. Blocks (1), (2) and (3) are recorded in an end portion of the user data area. Block (1) is a defect block, which has a replacement block for replacing the defect block. Block (2) is a defect block, which does not have a replacement block for replacing the defect block. Block (3) is a defectable block.

In this state, when the new spare area #1 is allocated in a data area 130 on the disk 100 due to the disk re-initialization during the use of the disk 100, states of the blocks (1), (2) and (3), which still exist in the user data area after the disk re-initialization, are shown in FIG. 7B.

Referring to FIG. 7B, DFL entries with respect to the block (1) having a replacement block, the block (2) not having a replacement block, and the defectable block (3) are changed to DFL entries having state information indicating that these blocks have been re-initialized without certification and state information indicating that these blocks are defectable blocks.

FIG. 8A is a diagram of state information of a defect list 420, as shown, for example, in FIG. 4, including DFL entries just before re-initialization, that is, before a new spare area is allocated in a data area 130 on the disk 100 according to an embodiment of the present invention in a state illustrated in FIG. 7A, and FIG. 8B is a diagram of state information of the defect list 420 including DFL entries just after re-initialization, that is, after the new spare area is allocated in a data area 130 on the disk 100 in a state illustrated in FIG. 7B.

Referring to FIG. 8A, a DFL entry for the block (1) is the first entry shown in FIG. 8A. Since block (1) is a defect block having a replacement block, its first state information 510, as shown, for example, in FIG. 5, is set to "1," and since a physical address of the defect block 520 is "0010000h" and the defect block is not re-initialized, its second state information 530 is set to "0." Since block (2) is a defect block not having a replacement block, its first state information 510 is set to "2," and since a physical address of the defect block 520 is "0010100h" and the defect block is not re-initialized, its second state information 530 is set to "0." Since block (3) is a defectable block, its first state information 510 is set to "3," and since a physical address of the defect block 520 is "0010110h" and the defect block is not re-initialized, its second state information 530 is set to "0."

A DFL entry list (defect list) 420 shown in FIG. 8A is changed to a DFL entry list 420 shown in FIG. 8B by the re-initialization in which the spare area is newly allocated in a data area 130 on the disk 100.

Referring to FIG. 8B, the DFL entry for the block (1) is the first entry shown in FIG. 8B, a DFL entry for the block (2) is the second entry, and a DFL entry for the block (3) is the third entry. For each of the DFL entries for the blocks (1), (2) and (3), first state information 510 is set to "3" indicating a defectable block due to the re-initialization, and second state information 530 indicating whether to be re-initialized is set to "1" indicating that re-initialization has been performed.

Likewise, since a defect block in the user data area on the disk 100 after disk re-initialization is a defectable block, when data is recorded at a later time, it is preferable to certify if the block is a defectable block by performing a verify-after-write process.

After second state information 530 of a DFL entry is set to "1" indicating that re-initialization has been performed due to the re-initialization, if a corresponding block is used again, the second state information 530 should be set to "0." The second state information 530 due to the re-initialization is set to "1" to indicate that data recorded in a corresponding block is not valid any more due to the re-initialization.

Figure 9A:
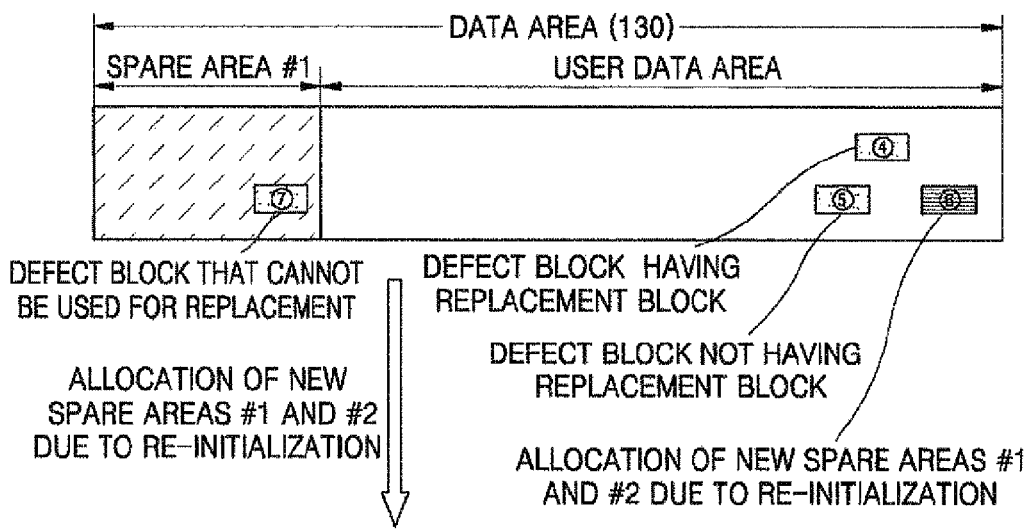
FIGS. 9A and 9B are illustrative diagrams of a method of processing DFL entries with respect to blocks in spare areas newly allocated due to disk re-initialization according to an embodiment of the present invention.
Figure 9B:
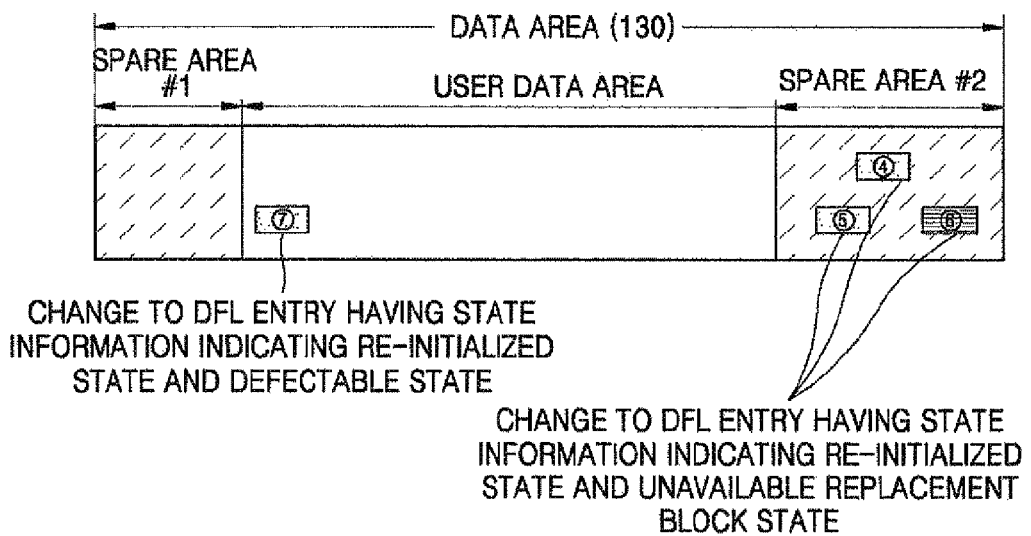

FIGS. 9A and 9B are illustrative diagrams of a method of processing DFL entries with respect to blocks in spare areas newly allocated on a disk 100 due to disk re-initialization according to an embodiment of the present invention.

FIG. 9A illustrates states of data blocks in an information storage medium that is a single layer disk, as shown in FIG. 2, in which a spare area #1 is allocated before the disk re-initialization, and FIG. 9B illustrates states of the data blocks in the disk 100 in which spare areas #1 and #2 are newly allocated on the disk 100 after the disk re-initialization.

Referring to FIG. 9A, a data area 130 includes a spare area #1 and a user data area. As shown in FIG. 9A, only the spare area #1 is allocated on the disk 100. Blocks (4), (5) and (6) are recorded in an end portion of the user data area, and block (7) is recorded in the spare area #1 on the disk 100. Block (4) is a defect block, which has a replacement block for replacing the defect block. Block (5) is a defect block, which does not have a replacement block for replacing the defect block. Block (6) is a defectable block. Block (7) is a replacement block in the spare area #1, which cannot be used for replacement.

In this state, due to the disk re-initialization during the use of the disk 100, since the new spare area #1 is reductively allocated, block (7) existed in the spare area #1 before the states of the re-initialization is included in the user data area after the re-initialization, and since the spare area #2 is newly allocated in a data area 130 on the disk 100, blocks (4), (5) and (6) existed in the user data area before the re-initialization are all included in the spare area #2 after the re-initialization. These states are shown in FIG. 9B.

Referring to FIG. 9B, if the defect blocks (4), (5) and (6) in the user data area on the disk 100 before the re-initialization is included in the spare area #2 due to the re-initialization, DFL entries for the blocks (4), (5) and (6) are changed to DFL entries having state information indicating that all the blocks are re-initialized without certification and state information indicating that they cannot be used for replacement. Also, if the replacement block (7) in the spare area #1 on the disk 100 before the re-initialization is included in the user data area due to the re-initialization, a DFL entry for the block (7) is changed to a DFL entry having state information indicating that the block (7) is re-initialized without certification and state information indicating that the block (7) is a defectable block.

FIG. 10A is a diagram of state information of a defect list 420 including DFL entries just before re-initialization, that is, before new spare areas are allocated in the data area 130 on the disk 100 according to an embodiment of the present invention in a state illustrated in FIG. 9A, and FIG. 10B is a diagram of state information of the defect list 420 including DFL entries just after re-initialization, that is, before the new spare areas are allocated in the data area 130 on the disk 100 in a state illustrated in FIG. 9B.

Referring to FIG. 10A, a DFL entry for the block (4) is the first entry shown in FIG. 10A. Since the block (4) is a defect block having a replacement block, its first state information 510, as shown, for example, in FIG. 5, is set to "1," and since a physical address of the defect block 520 is "0010000h" and the defect block is not re-initialized, its second state information 530 is set to "0." Since the block (5) is a defect block not having a replacement block, its first state information 510 is set to "2," and since a physical address of the defect block 520 is "0010100h" and the defect block is not re-initialized, its second state information 530 is set to "0." Since the block (6) is a defectable block, its first state information 510 is set to "3," and since a physical address of the defect block 520 is "0010110h" and the defect block is not re-initialized, its second state information 530 is set to "0." Since the block (7) is an unavailable replacement block, its first state information 510 is set to "5," and since a physical address of the defect block 520 is "0100000h" and the defect block is not re-initialized, its second state information 530 is set to "0."

A DFL entry list (defect list) 420 shown in FIG. 10A is changed to a DFL entry list (defect list) 420 shown in FIG. 10B by the re-initialization in which the spare areas are newly allocated in a data area 130 on the disk 100.

Referring to FIG. 10B, the DFL entry for the block (4) is the second entry shown in FIG. 10B, a DFL entry for the block (5) is the third entry shown in FIG. 10B, a DFL entry for the block (6) is the fourth entry shown in FIG. 10B, and a DFL entry for the block (7) is the first entry shown in FIG. 10B. For each of the DFL entries for the blocks (4), (5) and (6), first state information 510 is set to "5" indicating an available replacement block due to the re-initialization, second state information 530 indicating whether to be re-initialized is set to "1" indicating that re-initialization has been performed, and a physical address of each defect block 520 is changed to a location of a physical address of a replacement block 540. For the DFL entry for the block (7), first state information 510 is set to "3" indicating a defectable block due to the re-initialization, second state information 530 indicating whether to be re-initialized is set to "1" indicating that re-initialization has been performed, and a physical address of a replacement block 540 is changed to a location of a physical address of a defect block 520.

While the above methods are described in connection with an information storage medium that is a single layer disk 100, as shown in FIG. 2, such methods can also be applied to an information storage medium that is a double layer disk 100, as shown in FIG. 3, or even disk 100 having multiple recording layers.

As described above, a change of a defect list 420 without certification makes the defect list 420 have state information indicating that re-initialization without certification has been performed according to a method of re-initializing a rewritable information storage medium. Re-initialization without certification can be performed from time to time when quick re-initialization is needed, since it takes a relatively long time to perform the certification. Due to the quick re-initialization, blocks registered in a defect list 420 due to defects are stored in the defect list 420 as DFL entries having state information indicating that the blocks are not certified, that the blocks should be certified in the future, or that the blocks are defectable blocks, i.e., DFL entries in which second state information 530 is set. Thus when the blocks are used in the future, it is finally determined whether they are defect blocks according to the state information. That is, the quick re-initialization method improves the time efficiency by dividing the time for certification into periods of time of using each block.

A full or partial certification method with respect to the defect information is required in conjunction with the use of new defect information.

Thus, to clear off the defect information due to the re-initialization without certification according to an embodiment of the present invention, blocks having the defect information are certified using the full or partial certification method, so that the defect information can be removed from the defect list 420.

The full certification method is a method of certifying all the blocks in the user data area on the disk 100, and the partial certification method is a method of certifying some of all the blocks in the user data area on the disk 100. As an example of the partial certification method, only blocks, which are defectable blocks or defect blocks, in the defect list 420 are certified. By doing this, the certification can be performed in a relatively quick time. As an example of the full certification method, the entire user data area is certified using the verify-after-write process, it is determined whether each block is a defect block, and the determination result is reflected on the defect list 420.

A certification method according to an embodiment of the present invention will now be described herein below.

Figure 11A:
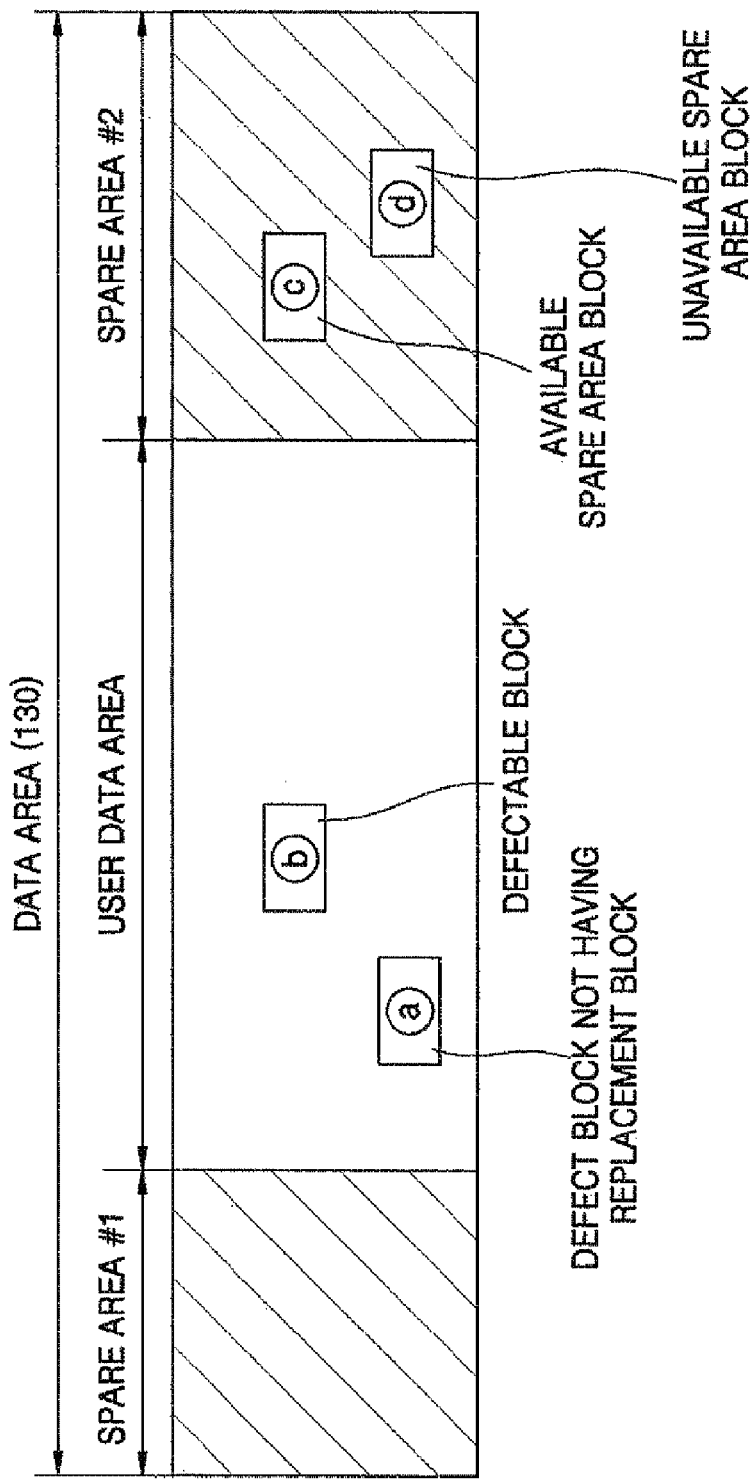
FIG. 11A is an illustrative diagram of a state of blocks in which second state information is set to "1" according to an embodiment of the present invention.

FIG. 11A is an illustrative diagram of a state of blocks in which second state information 530 is set to "1" according to an embodiment of the present invention.

Referring to FIG. 11A, block (a) is a defect block, which does not have a replacement block, in a user data area included in a data area 130 on the disk 100. Block (b) is a defectable block in the user data area included in a data area 130 on the disk 100. Block (c) is an available spare area block in a spare area #2 included in a data area 130 on the disk 100. In addition, block (d) is an unavailable spare area block in the spare area #2 included in a data area 130 on the disk 100.

Figure 11B:
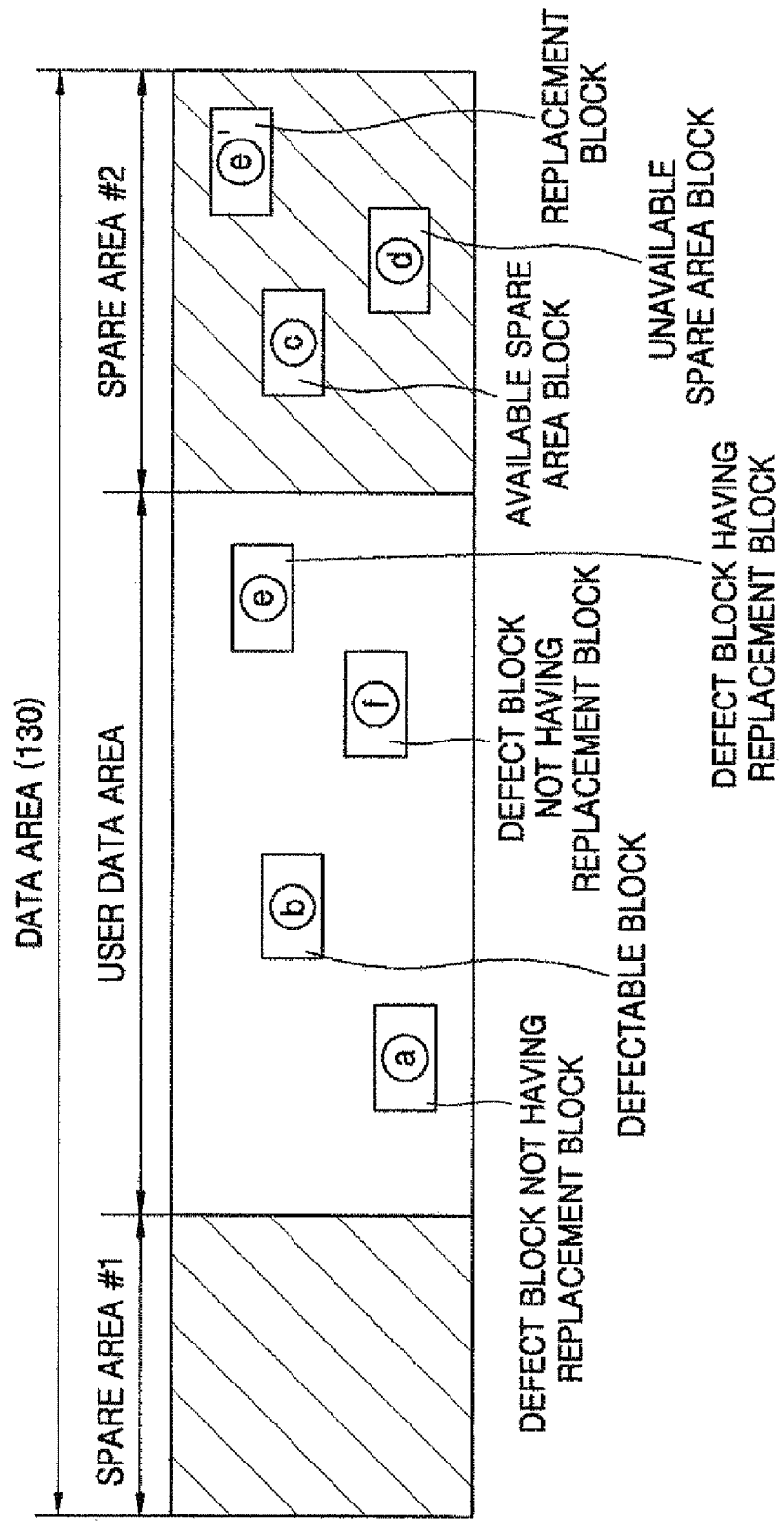
FIG. 11B is an illustrative diagram of a state in which two defect blocks and a replacement block are further generated in the state illustrated in FIG. 11A.

For example, a disk 100 having a state illustrated in FIG. 11A right after disk re-initialization can be a state illustrated in FIG. 11B due to use of the disk 100.

FIG. 11B is an illustrative diagram of a state in which two defect blocks and a replacement block are further generated in the state illustrated in FIG. 11A.

Referring to FIG. 11B, a defect block (e) is generated in the user data area included in a data area 130 on the disk 100. A replacement block (e)' replacing the defect block (e) is generated in the spare area #2 included in a data area 130 on the disk 100. In addition, a defect block (f) not having a replacement block, indicating that a block is generated but not replaced yet, is generated in the user data area in a data area 130 on the disk 100.

FIG. 12A is an example of entries indicating state information of the blocks in the state illustrated in FIG. 11B.

Referring to FIG. 12A, first four defect entries on a defect list 420 indicate DFL entries generated due to disk re-initialization, and next two defect entries on the defect list 420 indicate DFL entries generated during use of the disk 100.

For the first defect entry related to the defect block (a), which does not have a replacement block and exists in the user data area, its first state information 510 is set to "2" to indicate a state of a defect block not having a replacement block, and its second state information 530 is set to "1" to indicate that re-initialization without certification has been performed.

For the second defect entry related to the defectable block (b) existing in the user data area, its first state information 510 is set to "3" to indicate a defectable state, and its second state information 530 is set to "1" to indicate that re-initialization without certification has been performed.

For the third defect entry related to the available spare area block (c) existing in the spare area #2, its first state information 510 is set to "4" to indicate an available state, and its second state information 530 is set to "1" to indicate that re-initialization without certification has been performed.

For the fourth defect entry related to the unavailable spare area block (d) existing in the spare area #2, its first state information 510 is set to "5" to indicate an unavailable state, and its second state information 530 is set to "1" to indicate that re-initialization without certification has been performed.

For the fifth defect entry related to the defect block (e), which has a replacement block and exists in the user data area, its first state information 510 is set to "1" to indicate a state of a defect block having a replacement block, and its second state information 530 is set to "0" since re-initialization without certification has not been performed.

For the sixth defect entry related to the defect block (f), which does not have a replacement block and exists in the user data area, its first state information 510 is set to "2" to indicate a state of a defect block not having a replacement block, and its second state information 530 is set to "0" since re-initialization without certification has not been performed.

In this state, objects to perform the verify-after-write process according to an embodiment of the present invention are the first four entries whose second state information 530 is set to "1."

Figure 12B:
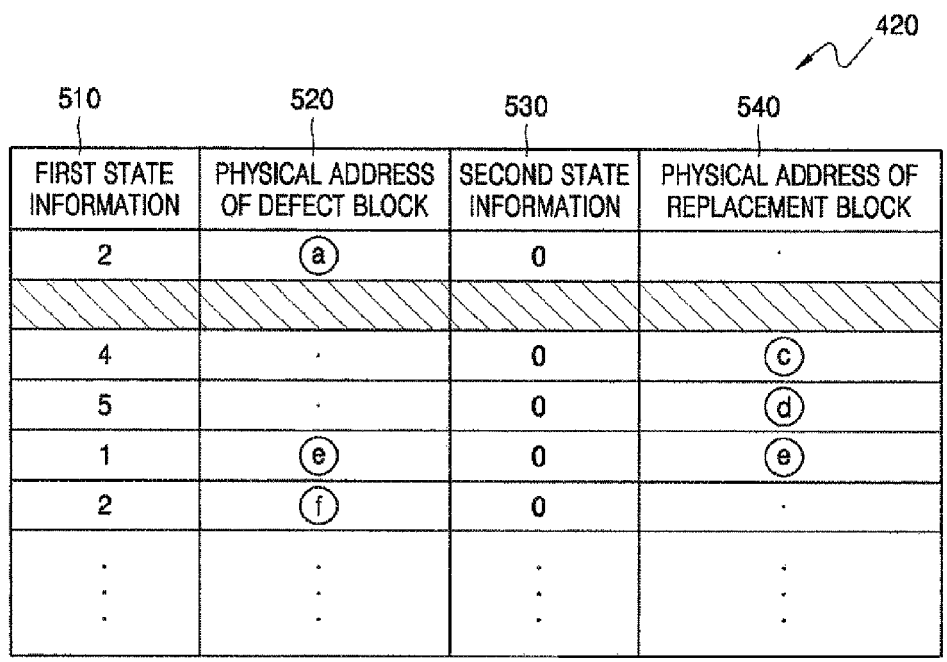
FIG. 12B is an illustrative diagram of a state in which entries are arranged using a verify-after-write process according to an embodiment of the present invention.

FIG. 12B is an illustrative diagram of a state in which the entries are arranged using the verify-after-write process according to an embodiment of the present invention.

Referring to FIG. 12B, for the first defect entry, if block (a) is certified and determined as a defect block, its first state information 510 is set to "2" to indicate a state of a defect block not having a replacement block, and its second state information 530 is set to "0" since the certification has been performed.

For the second defect entry, if block (b) is certified and determined as a non-defect block, the entry for the block (b) is deleted from the defect list 420 since the block (b) is an available block with no defect, which exists in the user data area included in a data area 130 on the disk 100.

For the third defect entry, if block (c) is certified and determined as a non-defect block, its first state information 510 is set to "4" to indicate an available state, and its second state information 530 is set to "0" since the certification has been performed.

For the fourth defect entry, if block (d) is certified and determined as a defect block, its first state information 510 is set to "5" to indicate an unavailable state, and its second state information 530 is set to "0" since the certification has been performed.

As a result, due to the verify-after-write process, all defect entries whose second state information 530 is set to "1" indicating that re-initialization without certification has been performed disappear from the defect list 420.

FIG. 13 is a flowchart illustrating procedures of a verify-after-write operation according to an embodiment of the present invention.

A drive system (i.e., a recording/reproducing apparatus, as shown in FIG. 1) receives a verify-after-write command from a host 3, as shown, for example, in FIG. 1, in operation 1310.

The drive system reads a defect list 420 recorded on an information storage medium such as a single layer disk 100, as shown, for example, in FIG. 2, or alternatively, a double layer disk 100, as shown, in FIG. 3, and stores the read defect list 420 in a memory at operation 1320.

The drive system seeks DFL entries whose second state information 530, as shown, for example, in FIG. 5, is set to "1" from the defect list 420, as shown, for example, in FIG. 4, stored in the memory at operation 1330, and performs a verify-after-write process for blocks registered in the sought entries at operation 1340.

If blocks registered in entries are blocks existing in a user data area on the disk 100, according to certification results, the drive system generates entries whose first state information 510, as shown, for example, in FIG. 5, is set to a defect block state and whose second state information 530 is set to "0" if defects exist and deletes corresponding defect entries if no defect exists, at operation 1350.

If blocks registered in entries are blocks existing in a spare area, according to the certification results, the drive system generates entries whose first state information 510 is set to an unavailable block state and whose second state information 530 is set to "0" if there exist defects, and generates entries whose first state information 510 is set to an available block state and whose second state information 520 is set to "0" if there exists no defect, at operation 1360.

The drive system records a defect list 420 including the generated entries on the disk 100, at operation 1370.

The certification method described above can be useful when re-initialization is performed through a certification process. Moreover, even if a disk is not re-initialized, the certification method can be used when defect entries of a defect list are simply rearranged in the middle of use of the disk.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, DVDs, etc.). The computer readable code stored on the computer readable recording medium can also be distributed over network coupled computer systems so that the computer readable code is stored and executed in a distributed fashion. And the functional programs, codes and code segments for embodying the present invention may be easily deducted by programmers in the art which the present invention belongs to.

As described above, according to embodiments of the present invention, a re-initialization process can be quickly performed by using a method of managing only defect information without a verify-after-write process. Furthermore, by a certification method according to embodiments of the present invention, defect information generated by performing quick re-initialization without certifying a disk can be effectively rearranged, thereby improving the performance of a drive system.

While the present invention has been particularly shown and described with reference to exemplary embodiments thereof, it will be understood by those of ordinary skill in the art that various changes in form and details may be made therein without departing from the spirit and scope of the present invention. For example, any rewritable optical disc, such as DVD-RW, DVD+RW, CD-RW and other high density disc, such as blue-ray disc (BD) and advanced optical disc (AOD) may be utilized. In addition, other storage media can also be utilized, including DVD, DVD-R, DVD-RAM, DVD-ROM, CD, CD-R, and CD-ROM, provided with a single recording layer or multiple recording layers for recording data as long as the defect management information is utilized in the manner as described with reference to FIG. 5, FIG. 6, FIGS. 7A-7B, FIGS. 8A-8B, FIGS. 9A-9B, FIGS. 10A-10B, FIGS. 11A-11B, FIGS. 10A-10B, FIGS. 11A-11B, FIGS. 12A-12B and FIG. 13. In addition, a single spare area as shown in FIGS. 7A-7B and multiple spare areas as shown in FIGS. 9A-9B and FIGS. 11A-11B can be fixed and/or flexible in sizes in designated areas of a data area on an optical disk. Similarly, the system controller can be implemented as a chipset having firmware, or alternatively, a general or special purposed computer programmed to implement techniques and methods as described with reference to FIG. 5, FIG. 6, FIGS. 7A-7B, FIGS. 8A-8B, FIGS. 9A-9B, FIGS. 10A-10B, FIGS. 11A-11B, FIGS. 10A-10B, FIGS. 11A-11B, FIGS. 12A-12B and FIG. 13. Accordingly, it is intended, therefore, that the present invention not be limited to the various example embodiments disclosed, but that the present invention includes all embodiments falling within the scope of the appended claims.

What is claimed is:

1. An apparatus for recording/reproducing data on/from an information storage medium, the apparatus comprising:
   a write/read unit configured to record data on the information storage medium and to read recorded data from the information storage medium comprising a defect list comprising at least one defect entry;
   a control unit arranged to:
   re-initialize the information storage medium;
   if a block which is managed by the defect list belongs to a user data area after the re-initialization of the information storage medium, generate a defect entry corresponding to the block, and store the defect entry in the defect list, the defect entry comprising first state information indicating that the block may have a defect, and location information of the block as location information of a defect block;
   certify the block; and
   remove the defect entry corresponding to the block from the defect list, or change the first state information or the second state information, according to a result of the certification,
   wherein the defect list comprises a defect list header comprising information on a number of defect blocks, and
   wherein the information on the number of defect blocks comprises:
   information on a number of defect blocks;
   information on a number of available spare blocks;
   information on a number of unavailable spare blocks; and
   information on a number of defectable blocks.

2. A method of managing defects on an information storage medium comprising a defect list comprising at least one defect entry, the method comprising:
   re-initializing the information storage medium;
   if a block which is managed by the defect list belongs to a user data area after the re-initialization of the information storage medium, generating a defect entry corresponding to the block, and storing the defect entry in the defect list, the defect entry comprising first state information indicating that the block may have a defect, and location information of the block as location information of a defect block;
   certifying the block using the second state information of the defect entry; and
   removing the defect entry corresponding to the block from the defect list, or changing the first state information or the second state information, according to a result of the certification,
   wherein the defect list comprises a defect list header comprising information on a number of defect blocks, and
   wherein the information on the number of defect blocks comprises:
   information on a number of defect blocks;
   information on a number of available spare blocks;
   information on a number of unavailable spare blocks: and
   information on a number of detectable blocks.

* * * * *